Figures 1, 6:
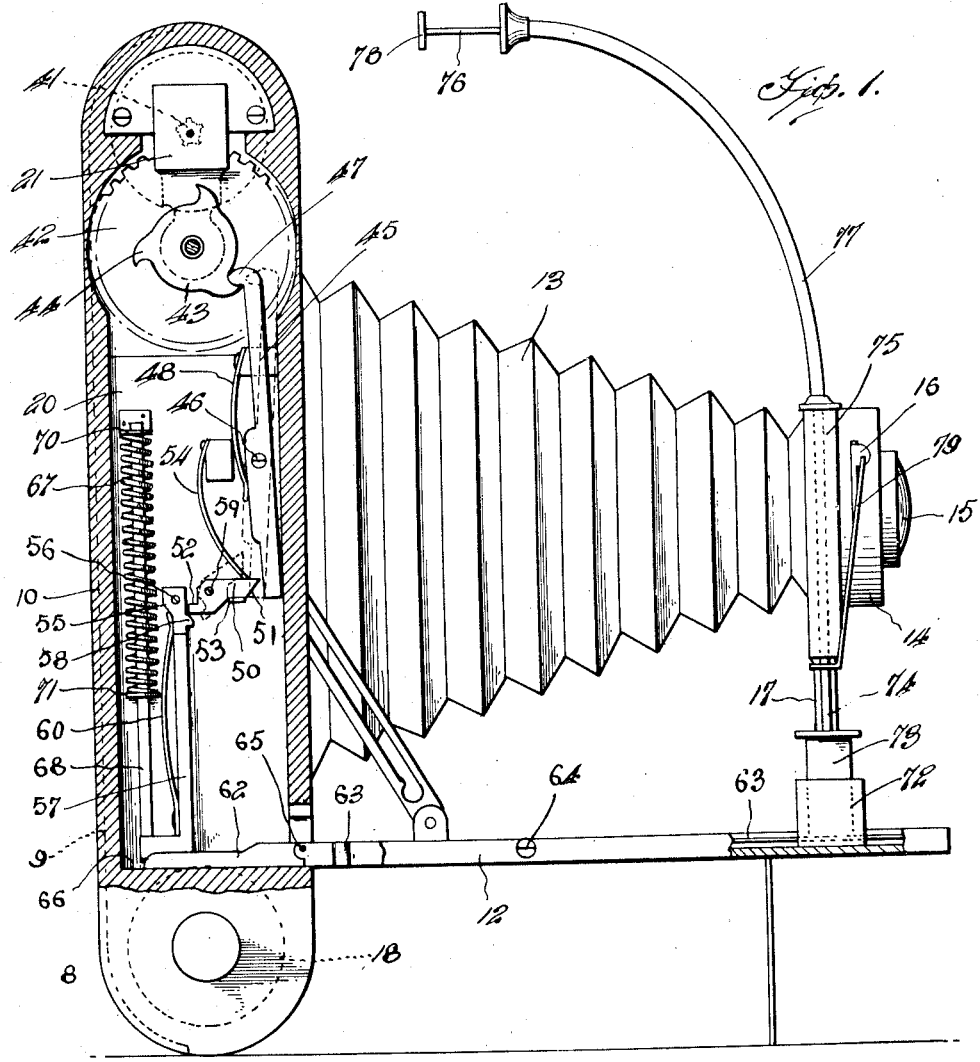

P. C. OSTEEN.
CAMERA.
APPLICATION FILED DEC. 24, 1915.

1,195,076.

Patented Aug. 15, 1916.
2 SHEETS—SHEET 1.

Witnesses

Inventor
Percy C. Osteen
By
Attorney

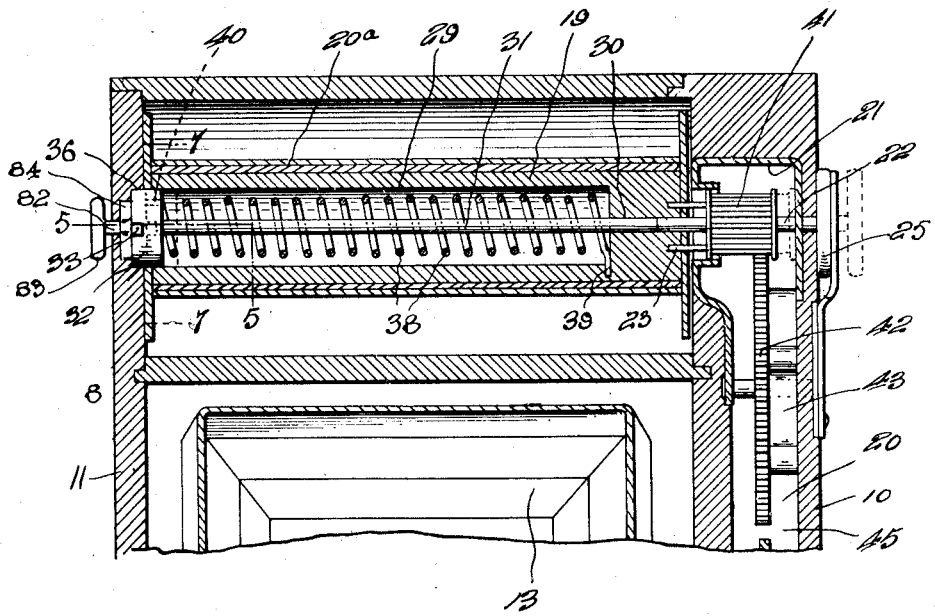
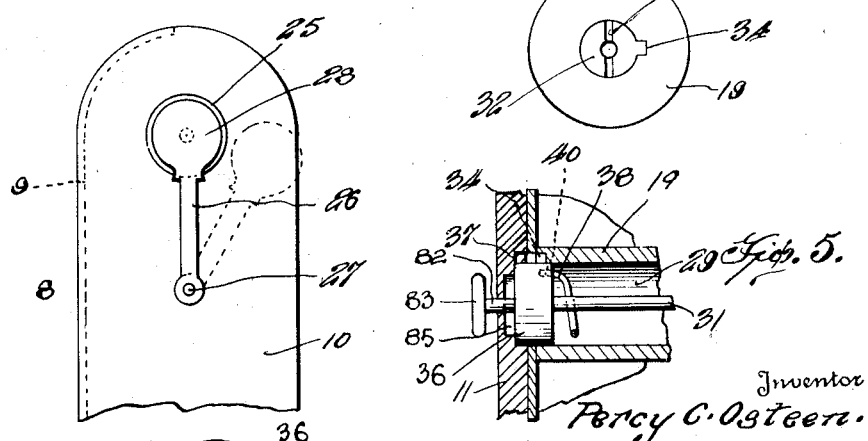
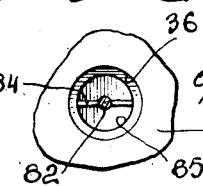

UNITED STATES PATENT OFFICE.

PERCY C. OSTEEN, OF ANDERSON, SOUTH CAROLINA.

CAMERA.

1,195,076.  Specification of Letters Patent.  Patented Aug. 15, 1916.

Application filed December 24, 1915. Serial No. 68,576.

*To all whom it may concern:*

Be it known that I, PERCY C. OSTEEN, a citizen of the United States, residing at Anderson, in the county of Anderson and State of South Carolina, have invented certain new and useful Improvements in Cameras; and I do hereby declare the following to be a full, clear, and exact description of the invention, such as will enable others skilled in the art to which it appertains to make and use the same.

This invention relates to cameras and has for its primary object to provide a simple and efficient device particularly adapted for use in connection with cameras of the folding type for automatically winding the film upon the film-receiving spool subsequent to the exposure of the successive sections of the film.

Another object is the provision of means operable by the shutter of the camera for controlling the winding mechanism.

With these and other objects in view, the invention consists in the novel construction, arrangement and formation of parts as will be hereinafter specifically described, claimed and illustrated in the accompanying drawings, in which:

Figure 1 represents a side elevation of a camera of the well known type, partly in section and illustrating the film winding mechanism, Fig. 2 represents a fragmental sectional view of one end of the camera, taken at right angles to Fig. 1, and looking toward the front of the camera, Fig. 3 represents a fragmental side elevation of the camera, Fig. 4 represents an end elevation of the film-receiving spool removed, Fig. 5 represents a fragmental sectional view on the line 5—5 of Fig. 2, Fig. 6 represents an end elevation of the film-receiving spool opposite that illustrated in Fig. 4, and Fig. 7 represents a sectional view on the line 7—7 of Fig. 2.

Referring to the drawing in detail, wherein similar reference numerals designate corresponding parts throughout the several views, the numeral 8 indicates the body of a camera of the well known type including the back or rear wall 9, side walls 10 and 11 and the front wall 12 hinged in the usual manner at its lower edge to the body 8 and adapted to be swung forwardly to a horizontal position, as illustrated in Fig. 1, to support the bellows 13 in the front end of which are secured the shuter 14 and lens 15. The shutter 14 is adapted to be operated in the usual manner by the operating or releasing lever 16 and the shutter and forward end of the bellows 13 are supported in operative position upon the hinged front 12 by the support 17. The opposite ends of the body 8 are provided with the usual spool-receiving chambers in which are mounted the film feeding and film receiving spools 18 and 19, respectively. The new or unexposed film is wound upon the feeding spool 18 and the free end thereof is secured in any suitable manner to the receiving spool 19. The side wall 10 at a point adjacent the end of the spool 19 is formed with a recess or cavity 20 in which is secured a bearing member 21 rotatably supporting a shaft 22. A relatively small gear wheel 41 is secured against rotary and sliding movement upon the shaft 22 and is provided with a plurality of laterally projecting pins 23 adapted to engage in apertures 24 formed in the adjacent end of the spool 19. A button or handle 25 is formed upon the outer extremity of the shaft 22, exteriorly of the camera body 8, whereby the shaft may be conveniently moved outwardly so as to disengage the pins 23 from the apertures 24 in the spool 19 to release and permit removal of the latter. A spring holder 26 is pivotally secured at 27 to the side wall 10 and is provided with an offset free end 28 adapted to engage over the button 25 to lock the shaft 22 in inwardly extended position.

The spool 19 is formed with an axial bore 29, which is reduced at one end, as indicated at 30 to approximately the same diameter as the shaft 22. A push rod 31 is slidably and rotatably engaged at one end in the reduced portion 30 of the bore and is provided at its opposite extremity with a circular head 32 formed with a peripheral lug 33 adapted to engage in a recess 34 formed in the outer extremity of the wall of the bore 29 to non-rotatably secure the push rod 31 in the spool 19. The portion of the wall 10 of the camera body in axial alinement with the bore 29 of the spool is formed with a circular recess 36, having a reduced cavity 37 in the wall thereof adapted to receive the lug 33 of the head 32 when the latter is moved longitudinally by engagement of the shaft 22 with the push rod 31. A coil spring 38 is arranged in the bore 29 and is anchored at one end, as at 39, in the spool 19 and at its opposite end, as at 40, in the circular head 32.

The relatively small gear wheel 41 is disposed in permanent mesh with a relatively large gear wheel 42, rotatably mounted in the recess 20 in the side wall 10, and having rigidly secured thereto a ratchet wheel 43, provided with radially directed teeth 44. A lever 45 is pivotally secured at 46 in the recess 20 and is provided at one end with a laterally projecting tooth 47, which is normally retained in the path of the teeth 44 of the wheel 43 by the tension of a leaf spring 48 engaged with said lever on the side of the pivotal axis 46 thereof opposite the tooth 47. The inner extremity of the lever 45 is engaged with a pivoted locking member 50, having a beveled end 51 at one end and a shoulder 52 at the opposite end thereof.

The beveled extremity of the locking member 50 is normally retained in engagement with a stop lug 53 formed in the wall of the recess 20 by the tension of a spring 54, and in its normal position the locking member locks the lever 45 in such position as to engage the tooth 47 thereof with one of the teeth 44 of the wheel 23 and thus lock the latter against rotation. A pawl 55 is pivotally secured at 56 to the free end of an arm 57 and is provided with a laterally projecting tooth 58 adapted to engage the shoulder 52 of the locking member 50 so as to swing the latter upon its pivotal axis 59 and release the lever 45. The tooth 58 of the pawl 55 is normally retained in the path of the shoulder 52 by the tension of a leaf spring 60.

The arm 57 is rigidly secured to and projects laterally of the inner section 62 of a sectional lever, the other section 63 being pivotally secured at 64 to the bed or hinged front 12. The adjacent ends of the lever sections 62 and 63 are pivotally secured together at 65 by a ruler joint, the pivot pin 65 being arranged in alinement with the axis of the hinged front 12, whereby the outer section 63 may be moved angularly with relation to the inner section 62 when the front 12 is closed. The inner lever section 62 is normally retained in engagement with the end wall 66 of the recess 20 by the tension of a coil spring 67, coiled about a rod 68 carried by the lever section 62 and engaged at one end with a bracket 70 and at its opposite end with a collar 71 secured upon the rod 68.

The forward extremity of the lever section 63 is reduced in width and engaged in a pair of diametrically opposed recesses formed in the lower extremity of a cylinder 72 in which is slidably mounted a plunger 73 carrying a rod 74 extending upwardly through a guide 75 carried by the front of the bellows 13 and connected with the operating cable 76. The cable 76 is slidably mounted in a flexible tube 77 secured at one end to the guide 75 and the free end of the cable is provided with a handle or button 78. The operating or releasing lever 16 of the shutter is connected by a rod 79 with the rod 76 carried by the plunger 73, whereby the shutter is actuated or released when the cable 76 is moved inwardly with relation to the tube 77.

A spool turning key 82 is rotatably and slidably mounted in the side wall 11 in axial alinement with the push rod 31 and is provided at its outer end with a head or handle 83. The inner extremity of the key 82 is provided with a pair of wings 84 adapted, when the key is moved outwardly, to be received within the reduced outer end 85 of the recess 36 and, when the key is moved inwardly, to engage in a diametrical slot 86 formed in the head 32.

In use, the film-receiving spool 19 is removed from the camera by swinging the holder 26 upon its pivot 27 and moving the shaft 22 outwardly so as to disengage the pins 23 thereof from the apertures 24 in the spool. Subsequent to the removal of the spool, the head 32 is partially disengaged from the bore 29 and is rotated so as to tension or wind the spring 38. The spring is retained in its wound condition by moving the head 32 inwardly and engaging the lug 33 thereof in the recess 34 of the spool 19. The spool is subsequently positioned in the camera body and the end of the film 20ª is secured thereto in any suitable manner. After replacing the spool in the camera body the shaft 22 is moved a short distance inwardly, thus engaging the inner extremity thereof in the spring 30. The first section of film is brought into position for exposure in the camera by moving the key 82 inwardly and engaging the wings 84 in the slot 86 and rotating the key 82 and spool 19. When the first section of the film is disposed in proper position for exposure the key 82 is moved outwardly, withdrawing the wings 84 from the slot 86 and the shaft 22 is moved farther inwardly. During its inward movement, the shaft 22 engages and pushes the rod 31 longitudinally, thus engaging the head 32 in the recess 36 in the side wall 11, the head being locked against rotary movement with relation to the side wall by the lug 33 engaging in the recess 37. The inward movement of the shaft 22 also engages the pins 23 in the recesses 24. With the head 32 in this position, it is evident that the tension of the spring 38 tends to rotate the spool 19 in a direction to wind the film 20ᵃ thereon, but the spool is prevented from rotating under the influence of the spring by the toothed end 47 of the lever 45 engaging the teeth 44 of the wheel 43.

The next section of the film is brought into position for exposure in the camera by operating of the cable 76 and at each actuation of the cable the rod 74, plunger 73 and forward extremity of the lever section 63 are depressed, thus elevating the inner lever section 62, moving therewith the arm 57. During its initial inward movement, the pawl 55 connected with the arm 57 engages the adjacent extremity of the locking member 50 and swings upon its pivotal axis 56 without disturbing said locking member. However, after the cable 76 is released the lever 62 and parts associated therewith are returned to normal position under the influence of the spring 67 and the tooth 58 engaging the shoulder 52 swings the locking member 50 to the dotted line position illustrated in Fig. 1, thus permitting the lever 45 to freely swing upon its pivotal axis 46. The influence of the spring 38, which normally tends to rotate the spool 19, drives the ratchet wheel 44, through the gear wheels 41 and 43 and thus automatically throws the tooth 47 of the lever 45 off of the tooth 44 of the wheel 43, releasing the latter and permitting the spool 19 to rotate under the influence of the spring 38. When the tooth 58 of the pawl 55 disengages the shoulder 52, the locking member 50 is automatically swung to normal position by the spring 54, thus locking the lever 45 and disposing the tooth 47 thereof in position to engage the next succeeding tooth 44 of the wheel 43 during rotation of the latter. Each time the cable 76 is actuated the shutter lever 16 is released by the movement of the rod 79, and during the return movement of the lever sections 62 and 63, subsequent to releasing the cable 76, the wheel 43 is automatically released and subsequently locked by the lever 45, thus permitting the spool 19 to rotate a predetermined number of times and thus wind the exposed portion of the film 20ᵃ thereon and present an unexposed portion of the film in position for subsequent exposure.

What I claim is:

1. In a camera, a body, a hinged front for said body, a film-receiving spool rotatably mounted in said body, means normally tending to rotate said spool, means to lock said spool against rotation, and means carried partly by said body and partly by said hinged front for releasing said locking means, and permitting closing of said hinged front.

2. In a camera, a body, a hinged front therefor, a shutter supported on said hinged front, a film-receiving spool rotatably mounted in said body, means normally tending to rotate said spool, means to lock said spool against rotation, means for releasing said locking means, and foldable means carried partly by said body and partly by said hinged front connecting said releasing means with said shutter for actuating the latter.

3. In a camera, a body, a film-receiving spool rotatably mounted in said body, a spring arranged within said spool and secured at one end to the latter, means for connecting the opposite end of said spring with said spool or said camera body, a rod carried by said connecting means, a spool-supporting shaft movable longitudinally in said body, extending exteriorly of the latter and movable inwardly into engagement with said rod for actuating the latter together with said connecting means.

4. In a camera, a body, a film-receiving spool rotatably mounted in said body, a spring arranged in said spool and connected at one end to the latter, means for connecting the opposite end of said spring with said spool or said camera body, a rod carried by said connecting means, a spool-supporting shaft movable longitudinally of said body, extending exteriorly of the latter and adapted to engage and actuate said rod and connecting means, and means for locking said shaft and rod in inwardly extended position.

5. In a camera, a body, a film-receiving spool rotatably mounted in said body, a spring arranged in said spool and connected at one end to the latter, means for connecting the opposite end of said spring with said spool or said camera body, and means operable exteriorly of said body for moving said connecting means from one position to another.

6. In a camera, a body, a film-receiving spool rotatably mounted in said body, a spring arranged within said spool and connected at one end to the latter, means for connecting the opposite end of said spring with said spool or said camera body and constituting a support for the adjacent end of said spool, means for locking said connecting means in engagement with said body and means for actuating said connecting means.

7. In a camera, a body, a film-receiving spool rotatably mounted in said body, spring means arranged in said spool and connected at one end to the latter, means for connecting the opposite end of said spring means with said spool or said body, a rod carried by said connecting means, a spool supporting shaft movable longitudinally in said body, extending exteriorly of said casing and movable inwardly into engagement with said rod, means to lock said spool against rotation, said locking means including a plurality of pins carried by said shaft and movable with the latter into non-rotatable engagement with said spool.

In testimony whereof I affix my signature in presence of two witnesses.

PERCY C. OSTEEN.

Witnesses:
 LOUIE P. GREEN,
 F. C. FARMER.